United States Patent
Lambrecht et al.

(10) Patent No.: US 6,721,694 B1
(45) Date of Patent: Apr. 13, 2004

(54) METHOD AND SYSTEM FOR REPRESENTING THE DEPTHS OF THE FLOORS OF THE OCEANS

(75) Inventors: Mark A. Lambrecht, Dallas, TX (US); Eugene J. Molinelli, Clifton, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/170,821

(22) Filed: Oct. 13, 1998

(51) Int. Cl.⁷ .............................. G06G 7/48; G06F 7/60
(52) U.S. Cl. .................. 703/2; 703/9; 702/5; 702/16; 702/17; 702/152; 702/193; 702/194; 367/7; 367/21; 367/73
(58) Field of Search ...................... 703/2, 9, 10; 434/6; 702/17, 16, 97, 100, 103, 106, 152, 153, 155, 156, 166, 167, 189, 190, 193, 194, 195–199; 367/7, 12, 21, 13, 72, 73, 87, 126; 362/25, 159, 195, 191, 180

(56) References Cited

U.S. PATENT DOCUMENTS

| | | | | |
|---|---|---|---|---|
| 3,869,601 A | * | 3/1975 | Metcalf | 342/41 |
| 3,906,352 A | | 9/1975 | Parker | 340/7 R |
| 4,562,540 A | | 12/1985 | Devaney | 364/400 |
| 4,663,726 A | * | 5/1987 | Chand et al. | 700/252 |
| 4,794,540 A | * | 12/1988 | Gutman et al. | 700/187 |
| 4,933,914 A | * | 6/1990 | Feintuch et al. | 367/87 |
| 4,949,281 A | * | 8/1990 | Hillenbrand et al. | 345/442 |
| 4,964,103 A | | 10/1990 | Johnson | 367/53 |
| 4,995,011 A | | 2/1991 | Spiesberger | 367/127 |
| 5,043,928 A | * | 8/1991 | Odencrantz et al. | 356/319 |
| 5,126,978 A | | 6/1992 | Chaum | 367/135 |
| 5,181,098 A | * | 1/1993 | Guerin et al. | 348/187 |
| 5,200,931 A | | 4/1993 | Kosalos et al. | 367/88 |
| 5,247,436 A | | 9/1993 | Stone, Jr. | 364/413 |
| 5,318,475 A | | 6/1994 | Schrock et al. | 460/1 |
| 5,321,613 A | | 6/1994 | Porter et al. | 364/420 |
| 5,383,114 A | | 1/1995 | Chambers | 364/421 |
| 5,402,067 A | * | 3/1995 | Pauly et al. | 324/307 |
| 5,404,296 A | | 4/1995 | Moorhead | 364/421 |
| 5,416,750 A | | 5/1995 | Doyen et al. | 367/73 |
| 5,428,558 A | * | 6/1995 | Cahill et al. | 356/319 |
| 5,451,961 A | * | 9/1995 | Rubin et al. | 342/159 |
| 5,504,678 A | | 4/1996 | Juszczak et al. | 364/421 |
| 5,539,704 A | | 7/1996 | Doyen et al. | 367/73 |
| 5,657,223 A | | 8/1997 | Juszczak et al. | 364/421 |
| 5,729,451 A | | 3/1998 | Gibbs et al. | 364/421 |
| 5,774,601 A | * | 6/1998 | Mahmoodi | 382/298 |

(List continued on next page.)

OTHER PUBLICATIONS

Davies and Dunn et al., "Data Accuracy in DMA's Hydrographic Source Assessment System (HYSAS)", GIS/LIS '95 Proceedings.*

(List continued on next page.)

*Primary Examiner*—W. D. Thomson
(74) *Attorney, Agent, or Firm*—Baker Botts L.L.P.

(57) ABSTRACT

A method for generating a model of a portion of the floor of a body of water from a plurality of depth measurement sources includes determining an overlap of any of the plurality of depth measurement sources with another depth measurement source and generating a relative shift between any two depth measurement sources that overlap. For each depth measurement source that overlaps with at least one other source, generating an overall shift based on the generated relative shifts. The method also includes generating a desired grid having a plurality of grid nodes and generating a model depth at a plurality of the grid nodes based, at least in part, on a global shift for the measurements of the plurality of sources based on the relative shift. Further, an output is generated of all model depths at respective grid nodes.

19 Claims, 6 Drawing Sheets

U.S. PATENT DOCUMENTS

| | | | | |
|---|---|---|---|---|
| 5,838,634 A | | 11/1998 | Jones et al. ................... | 367/73 |
| 5,884,229 A | | 3/1999 | Matteucci .................... | 702/14 |
| 5,978,646 A | | 11/1999 | Weinberg ..................... | 434/6 |
| 5,983,067 A | | 11/1999 | Weinberg ..................... | 434/6 |
| 5,995,882 A | | 11/1999 | Patterson et al. ............ | 701/21 |
| 5,995,906 A | | 11/1999 | Doyen et al. ................. | 702/16 |
| 6,002,914 A | | 12/1999 | Weinberg ..................... | 434/6 |
| 6,154,708 A | * | 11/2000 | Koashi ........................ | 702/40 |
| 6,185,512 B1 | | 2/2001 | Lambrecht ................... | 702/97 |
| 6,345,235 B1 | * | 2/2002 | Edgecombe et al. .......... | 702/27 |
| 6,456,339 B1 | * | 9/2002 | Surati et al. ................ | 348/745 |

OTHER PUBLICATIONS

Data Accuracy In the Defense Mapping Agency's Hydrographic Source Assessment System (HYSAS), Davies et al., pp. 24 256, 1995–noted on prior 892, paper 12, copy now provided.*

Lawrence, M.W., "Acoustic Deep Bottom Experiment", Bulletin of the Australian Acoustical Society, vol. 12, No. 2, p. 57; Aug. 1984.

Penny Dunn, Eugene Molinelli, Mark Lambrecht, "Data Fusion for a Model Seafloor Depths," The HYSAS Program at NIMA, paper presented at The Oceanology International '97 Asian–Pacific Rim Conference in Singapore, May 1997, © 1997 Raytheon Systems Company, Inc., 15 pps.

"Remote Sensing for Marine and Coastal Environments," Proceedings of the Fourth International Conference, Technology and Applications, HYSAS Overview, presented at the Fourth International Conference on Remote Sensing for Marine and Costal Environments, Orlando, Florida, Mar. 17–19, 199.7, © 1997 Raytheon Systems Company, Inc., 11 pps.

David L. B. Jupp, Alan H. Strahler, Member, IEEE, and Curtis E. Woodcock, "Autocorrelation and Regularization in Digital Images, I. Basic Theory", IEEE Transactions on Geoscience and Remote Sensing, vol. 26, No. 4, Jul. 1988, pps. 463–473.

David L. B. Jupp, Alan H. Strahler, Member, IEEE, and Curtis E. Woodcock, "Autocorrelation and Regularization in Digital Images, II. Simple Image Models", IEEE Transactions on Geoscience and Remote Sensing , vol. 27, No. 3, May 1989, pps. 247–258.

Paul J. Curran and Jennifer L. Dungan, "Estimation of Signal–to–Noise: A New Procedure Applied to AVIRIS Data", IEEE Transactions on Geoscience and Remote Sensing, vol. 27, No. 5, Sep. 1989, pps. 620–628.

Peter M. Atkinson and Paul J. Curran, "Defining an Optimal Size of Support for Remote Sensing Investigations", IEEE Transactions on Geoscience and Remote Sensing, vol. 33, No. 3, May 1995, pps. 768–776.

Didier Jourdan, Centre Militaire d'Océanographie, Efstathios Balopoulos, National Center for Marine Research, HNODC, Maria–Jesus Garcia–Fernandez, Instituto Español de Oceanografia, Catherine Maillard, IFREMER/SISMER, "Objective Analysis of Temperature and Salinity Historical Data Set over the Mediterranean Basin", pps. 82–87, 1998.

D. Rees and J–P. Muller, Department of Photogrammetry and Surveying, University College London, "Surface Roughness Estimation Using Fractal Variogram Analysis", pps. 1951–1954.

Gregory J. White, Naval Systems Engineering Department, U.S. Naval Academy, USA, and Bilal M. Ayyub, Department of Civil Engineering, University of Maryland, "Semivariogram and Kriging Analysis in Developing Aampling Strategies", 1990 IEEE, pps. 360–365.

I–I Lin and W. G. Rees, Scott Polar Research Institute, University of Cambridge, "Apatial Texture in AirSAR Images of the Greenland Ice Sheeet", 1994 IEEE, pps. 2385–2387.

A. T. C. Chang, Hydrological Sciences Branch, Goodard Space Flight Center and L. S. Chiu, Applied Research Corporation, Decorrelation Distance of Snow in the Colorado River Basin, pps. 1247–1250.

* cited by examiner

METHOD AND SYSTEM FOR REPRESENTING THE DEPTHS OF THE FLOORS OF THE OCEANS

STATEMENT OF GOVERNMENTAL INTEREST

This invention was made with Government support under Contract No. DMA800-94-C-8000 awarded by the Defense Mapping Agency (DMA, now the National Imagery and Mapping Agency, NIMA). The Government has certain rights in the invention.

TECHNICAL FIELD OF THE INVENTION

This invention relates generally to depth measurement and more particularly to a method and system for representing the depths of the floors of the oceans.

BACKGROUND OF THE INVENTION

Representations of the bottom of the oceans, or oceans' floors, are useful for a variety of purposes. For example, ocean explorers often require detailed information concerning the depth at various locations on oceans' floors to perform their exploration activities. In addition, ship and submarine captains often require detailed depth information to avoid collisions with the oceans' floors. Such information is generally referred to as bathymetric data, and a model of ocean floors is generally referred to as a bottom model.

Measurements are often available from a variety of sources for use in generating a bottom model. Such sources include distinct data measurements taken by different vessels in overlapping areas of an ocean floor such that a depth measurement at a given location is provided by more than one source. These multiple depth measurements generally do not indicate the same depth. One approach to addressing the availability of data from a number of sources in a given region involves discarding data from all but one source. However, such discarding of data results in a less accurate bottom model than could be obtained if all data measurements were utilized. Although it is desirable to generate a bottom model that is based upon the combination of data measurements taken by a plurality of sources, such combining may lead to inconsistent values for a depth at a given location. Therefore, in the generation of a bottom model, depth measurements should be combined in a way that produces only one depth value at each location.

In bottom model generation, it is often desirable to generate a depth at a plurality of designated locations on the ocean floor, such as grid locations; however, data measurements are often taken at randomly distributed locations. Therefore, a method is needed to generate a bottom model having model depths at grid locations that do not necessarily coincide with the location of depth measurements. Moreover, it is also advantageous for such grid locations to provide depth values at spatial resolutions that are consistent with the measured data.

SUMMARY OF THE INVENTION

Accordingly, a need has arisen for an improved method and system for representing the depths of the floors of the oceans. The present invention provides an apparatus and method for representing the depths of the floors of the oceans that addresses shortcomings of prior systems and methods.

According to one embodiment of the invention, a method for generating a model of a portion of a floor of a body of water from a plurality of depth measurement sources includes determining an overlap of any of the plurality of depth measurement sources with another depth measurement source and generating a relative shift between each two depth measurement sources that overlap. The method also includes, for each depth measurement source that overlaps with at least one other source, generating an overall shift based on the generated relative shifts. The method also includes generating a desired grid having a plurality of grid nodes and generating a model depth at a plurality of the grid nodes based, at least in part, on the overall shifts. The method also includes generating an output of all model depths at respective grid nodes.

Embodiments of the invention provide numerous technical advantages. For example, in one embodiment, biases among data sets are reduced by shifting the data sets. Furthermore, the shifting gives greatest weight to data sets having the smallest measurement errors. In addition, in another embodiment of the invention, the resolution of a data set is automatically generated without requiring subjective evaluation of the data, which increases processing speed and results in a more accurate bottom model. Furthermore, overlapping data source sets are combined, which provides for a more accurate bottom model than would obtained if data were discarded. In addition, a more accurate bottom model is obtained by interpolating data values according to semi-variograms that are constructed based only on nearby data points, rather than all available data. This procedure accounts for varying levels of correlation of data within a data source set and therefore produces a more accurate bottom model.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

The present invention and advantages thereof are best understood by referring to FIGS. 1 through 10 of the drawings, like numerals being used for like and corresponding parts of the various drawings.

Figure 1:
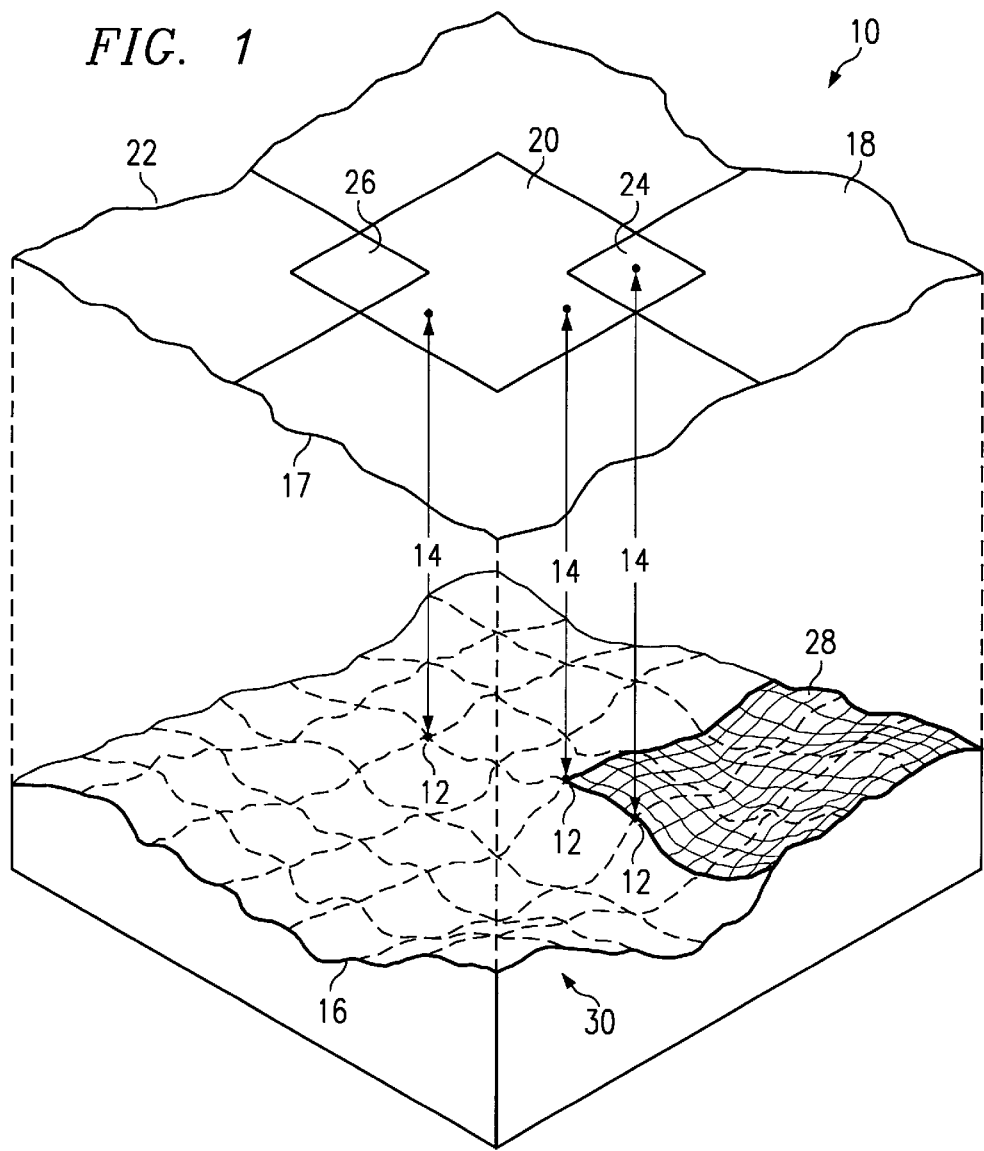
FIG. 1 is an isometric drawing illustrating a representation of the floor of an ocean, based on data received from a plurality of data sources.

FIG. 1 is an isometric drawing illustrating a representation, or bottom model 10, of a floor 16 of an ocean based on data received from a plurality of data sources. Bottom model 10 includes a plurality of calculated depths 14, also referred to herein as model depths, at respective grid locations 12. Model depths 14 at locations 12 are generated based on depth measurements taken by a plurality of data sources, as described with reference to FIG. 2. Although calculated depths are illustrated in FIG. 1 as depths relative to an ocean surface to facilitate description of the invention, other suitable depth reference points are utilized by the invention to create a bottom model, including a global vertical datum. Each of the plurality of data sources produces a data source set having a plurality of depth measurements at associated locations. The location of data source sets 18, 20, and 22 are illustrated in FIG. 1.

As illustrated, data source set 18 overlaps with data source set 20 to produce an overlap region 24. Data source set 20 also overlaps with data source set 22 to produce an overlap region 26. In overlap regions 24 and 26, data measurements from more than one source are available. To produce the most accurate bottom model 10 of ocean floor 16, data from both data source sets 18 and 20 should be used to represent overlap region 24, and data from both data source sets 20 and 22 should be used to represent overlap region 26. Therefore, data set sources 18, 20, and 22 are combined as described below in conjunction with FIGS. 3 through 9 to produce bottom model 10.

Model depths 14 at associated locations 12 are illustrated as occurring at evenly-spaced increments in both a high resolution area 28 and a low resolution area 30. Providing a bottom model 10 having calculated depths 14 at evenly-spaced locations for regions of the bottom model is desirable. High resolution area 28 of bottom model 10 is an example of a portion of bottom model having a greater resolution than low resolution area 30. High resolution area 28 utilizes a finer spaced grid because an associated data source set includes a greater number of data measurements that support a higher resolution grid. Providing a finer spaced grid where associated data support the higher resolution generates a more accurate bottom model. The determination of the horizontal resolution of data within a portion of each data source set is described in conjunction with FIGS. 3 and 4. Although it is desirable to provide depths 14 in regions having evenly spaced grid locations 12 within bottom model 10, depth measurements in data source sets 18, 20, and 22 generally are spaced randomly and do not coincide with grid locations 12. Therefore, a gridded representation is generated such as is shown in areas 28 and 30 and model depths 14 are calculated based on depth measurements included within data source sets 18, 20, and 22. Calculation of model depths 14 at grid locations 12 according to the teachings of the present invention are described below in conjunctions with FIGS. 2 through 9.

Figure 2:
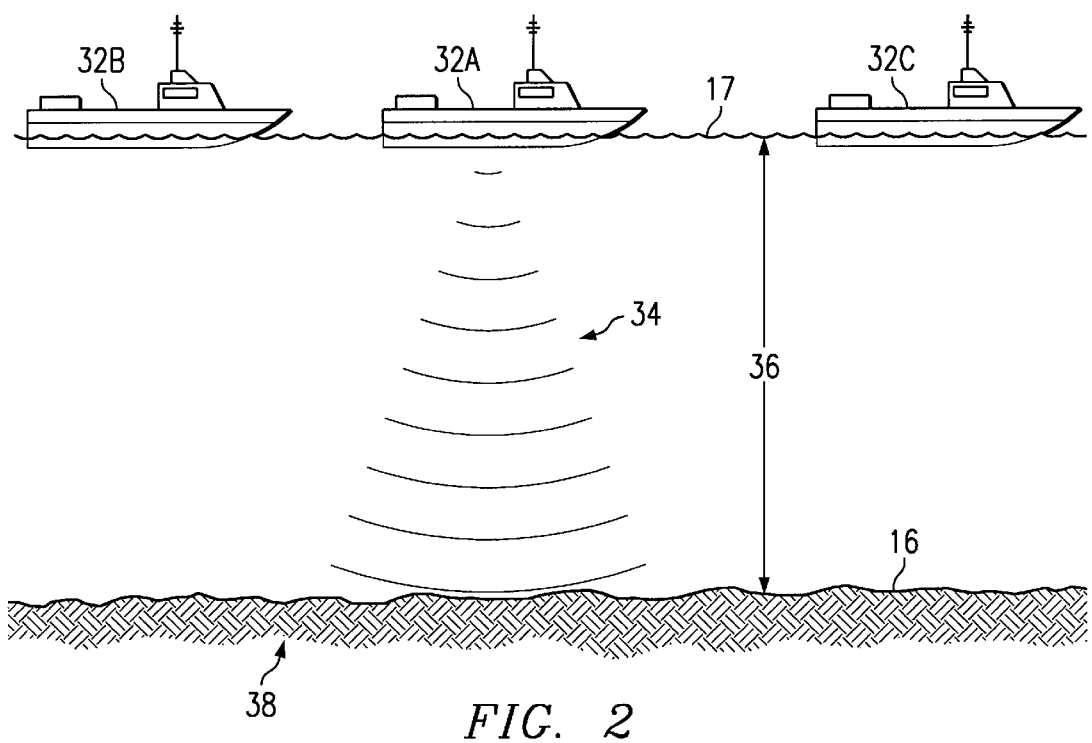
FIG. 2 is a schematic drawing illustrating the measurement of the depth of a portion of the ocean floor.

FIG. 2 is a schematic drawing illustrating the measurement of a measured depth 36 of a portion of ocean floor 16 with respect to an ocean surface 17. An example method for generating measured depths 36 of ocean floor 16 at a measured location 38 is described with reference to FIG. 2. In this example, an ocean vessel 32A transmits sound waves 34 to ocean floor 16 at measured location 38. Measured depth 36 may be determined based on the time required for waves 34 to reflect off ocean floor 16. A plurality of ocean vessels 32A, 32B, 32C are used to perform such measurements and lead to data source sets 18, 20, and 22 that contain overlapping data in overlap regions 24 and 26. Combining overlapping data in data source sets 18, 20, and 22 and generating a bottom model 10 is described below with reference to FIGS. 3 through 10.

Figure 3:
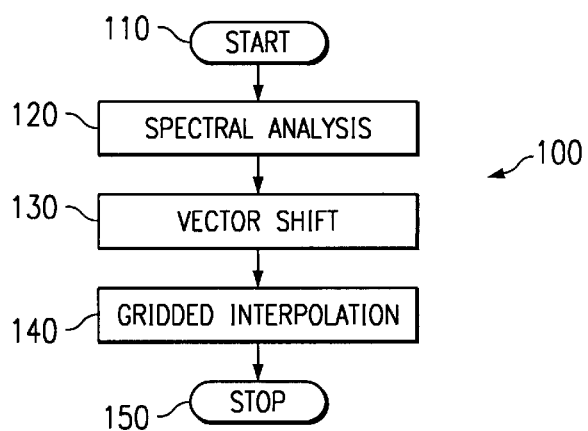
FIG. 3 is a flow chart illustrating a process for generating a representation of a portion of an ocean floor according to the teachings of the present invention.

FIG. 3 is a flow chart illustrating a process 100 for generating bottom model 10 of a portion of an ocean floor according to the teachings of the present invention. The method begins at a step 110. At a step 120, a spectral analysis of depth measurements 36 within data source sets 18, 20, and 22 is performed automatically. A spectral analysis is performed in order to determine the least number of data points containing the maximal surface information within a given region of data that is required to be stored in subsequent processing steps of combining data from data source sets 18, 20, and 22 and generating a bottom model corresponding to grid locations 12. Step 120 of performing a spectral analysis includes automatically generating a Real World Nyquist frequency for a region within a given data source set that has a fairly consistent horizontal resolution. Horizontal resolution refers to resolution along ocean floor 16. In addition to allowing storing of the least number of data points necessary to reproduce data measurements within data source sets 18, 20, and 22, the Real World Nyquist frequency corresponding to each region of a data source set is used in subsequent steps of process 100 of generating a bottom model of a portion of an ocean floor.

Although it is common to refer to the output of spectral analysis as a frequency spectrum that indicates an amplitude that is related to energy as a function of frequency, technically the independent variable is frequency only when the input data are spread apart in time. When the input data are spread apart in distance, as in the case of depth measurements used herein, technically a wavenumber spectrum is produced and the independent variable is wavenumber, which is inversely proportional to wavelength. As used herein, the term "frequency" is a synonym for "wavenumber" or "wavelength," depending on the context. For example, the Real World Nyquist frequency is technically a Real World Nyquist wavenumber, which is related to a particular wavelength that may be called a Real World Nyquist wavelength.

After step 120 of performing a spectral analysis, a step 130 of performing a vector shift is executed. In step 130, data within data source sets 18, 20, and 22 are shifted to account for differences between measurements in the individual data source sets. Such differences may occur due to measurement error, improper calibration of measurement instrumentation, inaccuracies in determining a measured location 38 at which a measurement is taken, use of different vertical datums or other similar reasons. Step 130 includes comparing each pair of overlapping data source sets to determine a relative shift between each pair. The relative shifts between each pair are then utilized to determine a global shift for each data set. Step 130 of performing a vector shift includes a shift associated with the measured location 38 at which a measured depth 36 is measured, as well as shifting the measured depth 36 at that location. In this example, measured location 38 may be described by a latitude and a longitude, and therefore a shift of the location utilizes both a shift along a constant longitude and a shift along a constant latitude. Step 130 of performing a vector shift includes in one embodiment the result of step 120 of performing a spectral analysis, as described in greater detail below in conjunction with FIGS. 6 and 7.

The results of step 130 are utilized in a step 140 of performing a gridded interpolation in order to produce bottom model 10 having depth values 14 at evenly spaced gridded locations 12 for given regions of the bottom model. The method concludes at a step 150 and results in bottom model 10. Exemplary details associated with each step 120, 130, and 140 are described below in conjunction with FIGS. 4 through 10. Step 120 of performing a spectral analysis is described in conjunction with FIGS. 4 and 5; step 130 of performing a vector shift is described in conjunction with FIGS. 6 and 7; and step 140 of performing a gridded interpolation is described with reference to FIGS. 8, 9A, and 9B. A computer system for implementing the above-described process is described with reference to FIG. 10.

Figure 4:
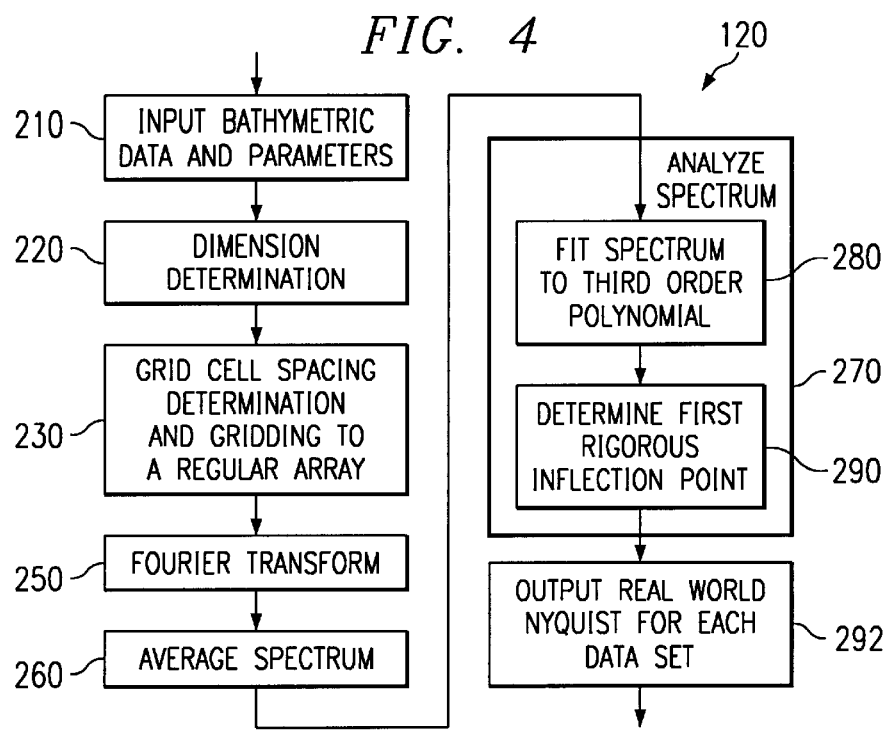
FIG. 4 is a flow chart illustrating steps associated with the step of performing a spectral analysis, as illustrated in FIG. 3.
Figure 5:
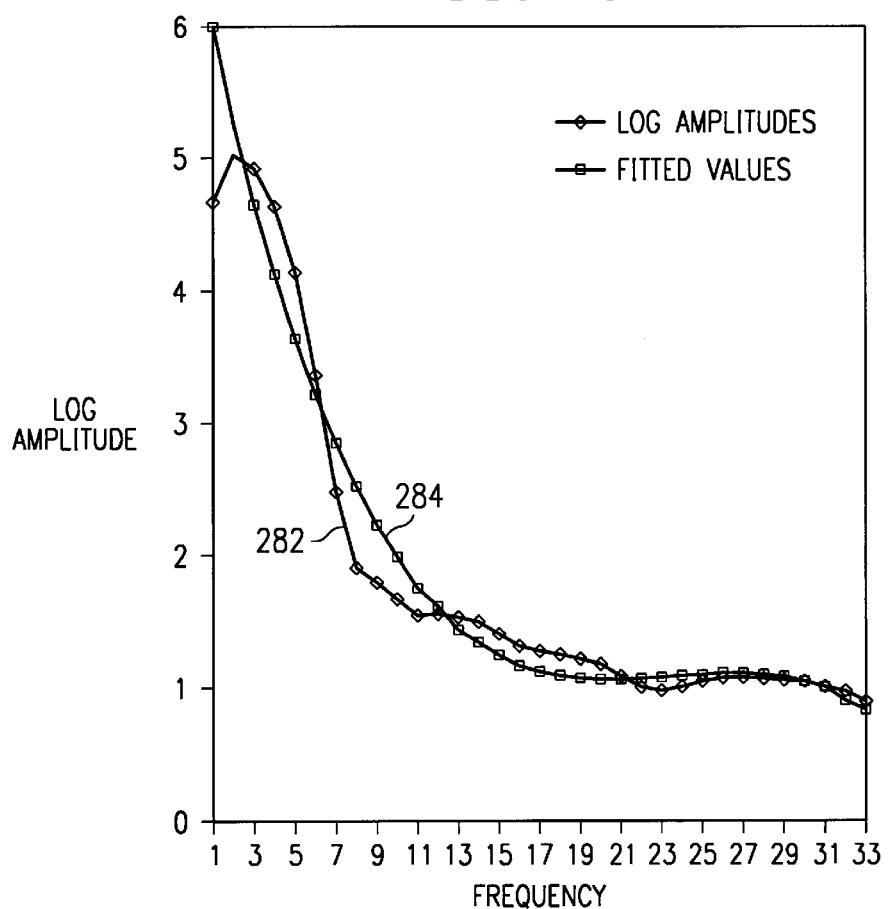
FIG. 5 is a graph illustrating measured and fitted depth data that are associated with steps illustrated in FIG. 4 of fitting a frequency spectrum to a third order polynomial and determining a first rigorous inflection point.

FIG. 4 is a flow chart illustrating steps associated with step 130 of performing a spectral analysis, and FIG. 5 is a graph illustrating steps in FIG. 4 associated with fitting a frequency spectrum to a third order polynomial and determining a first rigorous inflection point. A first step 210 of step 120, performing a spectral analysis, includes receiving bathymetric data. Bathymetric data refers to depth measurements 36 at specified measured locations 38, such as depth measurements within data source sets 18, 20, and 22. Associated parameters utilized within step 120 of performing a spectral analysis are also received at step 210. At a step 220 a determination is made of whether data measurements received at step 210 are associated with one or two dimensions. If it is determined that the data positions are reasonably linear in one horizontal direction, such as a constant longitude, the data are classified as one-dimensional. Otherwise, the data are analyzed in two dimensions.

In order to perform a spectral analysis on the data received at step 210, the data must be gridded into a regular array. At a step 230, a grid cell spacing is determined for the array, and the data are gridded into a regular array. Step 230 of determining a grid cell spacing involves grouping data from one data source set into regions that have a fairly constant resolution. Regions that have a fairly constant resolution are regions that have depth measurements 36 at locations 38 at similar spacings. Hereinafter, a region of a data source set that includes data having a fairly constant resolution is referred to as a "data set." Step 230 is performed for each data source set. One example of a method for gridding the data at step 230 is a Triangular Irregular Network algorithm for two-dimensional data. A corresponding one-dimensional algorithm is an exemplary algorithm for one-dimensional data. The Triangular Irregular Network algorithm is described in Macedonio G. and Pareschi M. T. (1991), *An Algorithm for the Triangulation of Arbitrarily Distributed Points: Applications to Volume Estimate and Terrain Fitting, Computers and Geosciences*, V. XVII, No. 17, pp. 859–874, which is incorporated herein by reference.

After gridding each data set, or in other words, each region within a data source set that has a fairly constant resolution, into a regular array, each data set is transformed to the frequency domain at a step 250. Transformation is performed by a Fast Fourier Transform. Because data sets may be large, each data set is divided into regions of 32×32 grid cells before performing the frequency transform. The resulting spectra for each 32×32 grid cell region are averaged into a single one-dimensional sample at a step 260 for each data set.

At a step 270 a one-dimensional spectrum for each data set is analyzed to produce a Real World Nyquist frequency for each data set. The Real World Nyquist frequency, or Nyquist critical frequency, is the frequency beyond which no more useful information can be gleaned about the surface in question. Thus, measurements taken at wavelength intervals shorter than the critical wavelength offer no new information, and any structure in the short wave length measurements is masked by noise. A first step in analyzing each spectrum is step 280 of fitting the spectrum to a third order polynomial. An example fit of a spectrum to a third order polynomial is illustrated in FIG. 5. Line 282 in FIG. 5 represents the measured values of a spectrum, and fitted line 284 represents a third order polynomial fit to the measured values. At a step 290 the first rigorous inflection point for third order polynomial is determined for the fitted line 284. The frequency at which the first rigorous inflection point occurs is provided as an automatic estimation of the Real World Nyquist frequency for each data set at a step 292.

The determination of the first rigorous inflection point of fitted line 284 corresponds to ascertaining an amplitude of the measured values at which the resolution is not great enough to support the data. In general, the Real World Nyquist frequency is chosen at the point in fitted line 284 where the log amplitude becomes somewhat constant. An inflection point is a point where the sign of a second derivative of fitted line 284 changes. In other words, the point of inflection of a curve is the frequency where the curve changes from concave-up to concave-down, or vice versa.

According to the invention, the first point of inflection with at least two subsequent frequencies with like-sign second derivatives is chosen as the initial Real World Nyquist frequency. Then, beginning at the initial frequency and moving toward lower frequencies, the final Nyquist critical frequency, $F_f$, is chosen with reference to the formula:

$$A(f) < L_i + T \tag{1}$$

where, $F_f$=final Nyquist critical frequency;

$L_i$=log amplitude at the initial Real World Nyquist frequency;

T=threshold given by T=0.2×minimum log amplitude determined at step 250; and

A(f)=log amplitude at frequency f.

The minimum log amplitude determined at step 750 is the log amplitude with the smallest value, taking into account all 32 log amplitudes on the plot. Thus, by determining a first rigorous inflection point of a polynomial fit to a frequency spectrum of data, a horizontal resolution for the data may be determined. Determination of a horizontal resolution of data in such a manner allows automatic horizontal resolution generation without resort to more subjective manual determination of the Real World Nyquist frequency on a case by case basis. Thus, a computer program can automatically generate a horizontal resolution for each data set without requiring a subjective evaluation of the data. In the present embodiment, the Real World Nyquist for each data set is utilized in step 130 of performing a vector shift and step 140 of performing a gridded interpolation.

Figure 6:
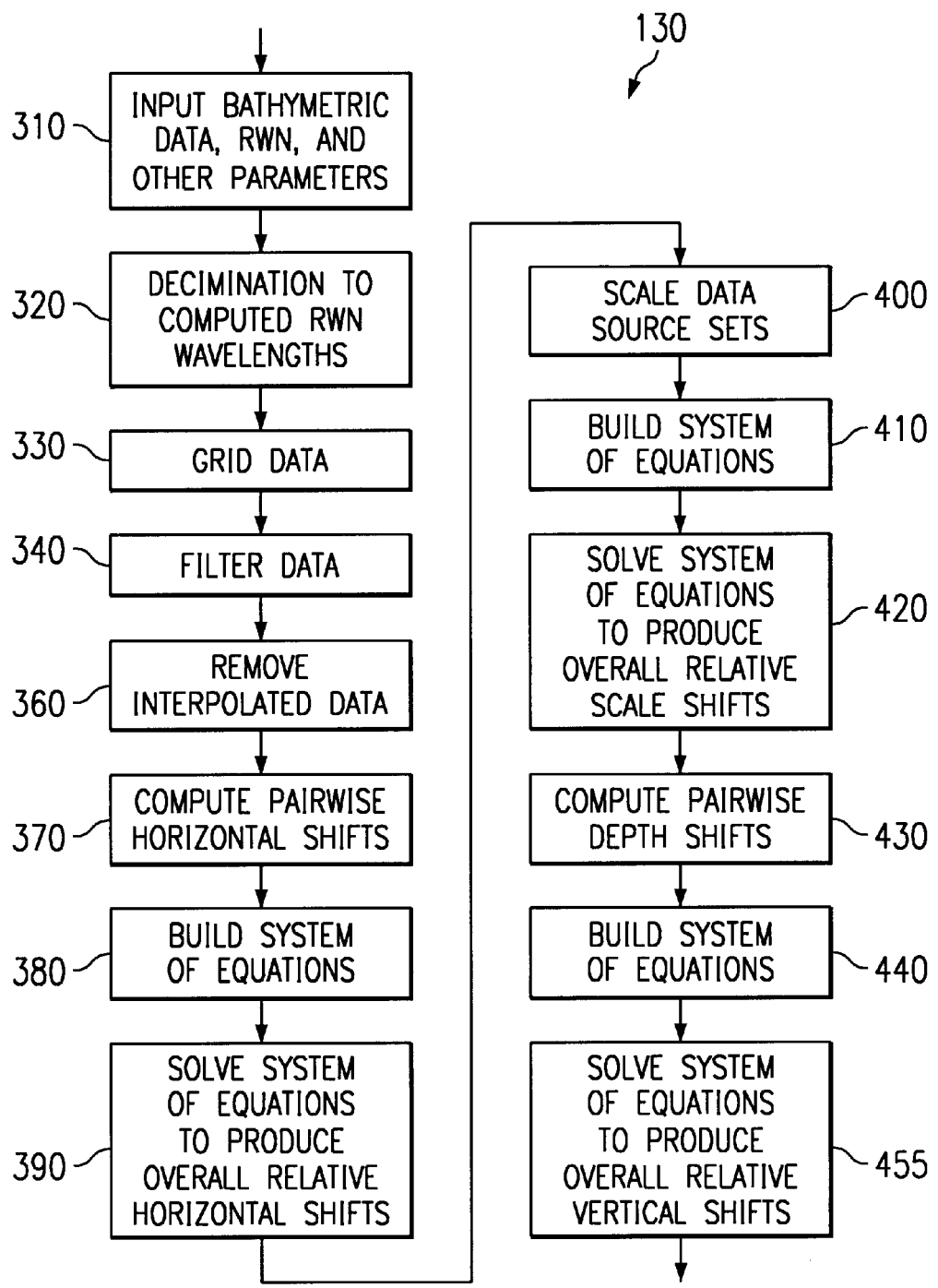
FIG. 6 is a flow chart illustrating steps associated with the step of performing a vector shift detection, as illustrated in FIG. 3.

FIG. 6 is a flow chart illustrating steps associated with the step 130 of performing a vector shift detection recited in FIG. 3. Step 130 of performing a vector shift detection begins with a step 310 of receiving bathymetric data, the Real World Nyquist frequencies calculated at step 120 for each data set, and additional parameters. Included in the bathymetric data are measurement error terms that describe the uncertainty of both horizontal position measurements and depth measurements for each data set. At a step 320, data in each data set is decimated to the associated computed Real World Nyquist wavelengths. Thus, data that occur more frequently than the Real World Nyquist wavelength of the associated data set are omitted. Such omission reduces computational requirements of a system implementing the vector shift step 130 and reduces white noise.

At a step 330 each data source set, for example data source sets 18, 20 and 22, is gridded at the smallest Real World Nyquist Resolution of all associated data sets. Such gridding is performed using the Triangular Irregular Network algorithm described above or other suitable gridding techniques. The gridded data for each data set are then filtered using a low pass filter at a step 340 to produce a low pass component for each data set. An example of a suitable low pass filter is a standard Gaussian filter with a half-width of six times the Real World Nyquist of the highest resolution associated data set. The filtering at step 340 reduces white noise and allows subsequent data shifts to be performed based on only the low frequency surface trends. After filtering at step 340, an additional gridding step (not explicitly shown) may be performed to grid the filtered data to the finest resolution of all contributing data sets. At a step 360, interpolated data that were added in the gridding process at step 330 are removed. These interpolated data are removed because of a tendency to bias a subsequent pairwise shift in undesirable ways. At step 370, pairwise shifts are calculated for each data set. Step 370 of computing pairwise shifts for each data set is described in greater detail with reference to FIG. 7.

Figure 7:
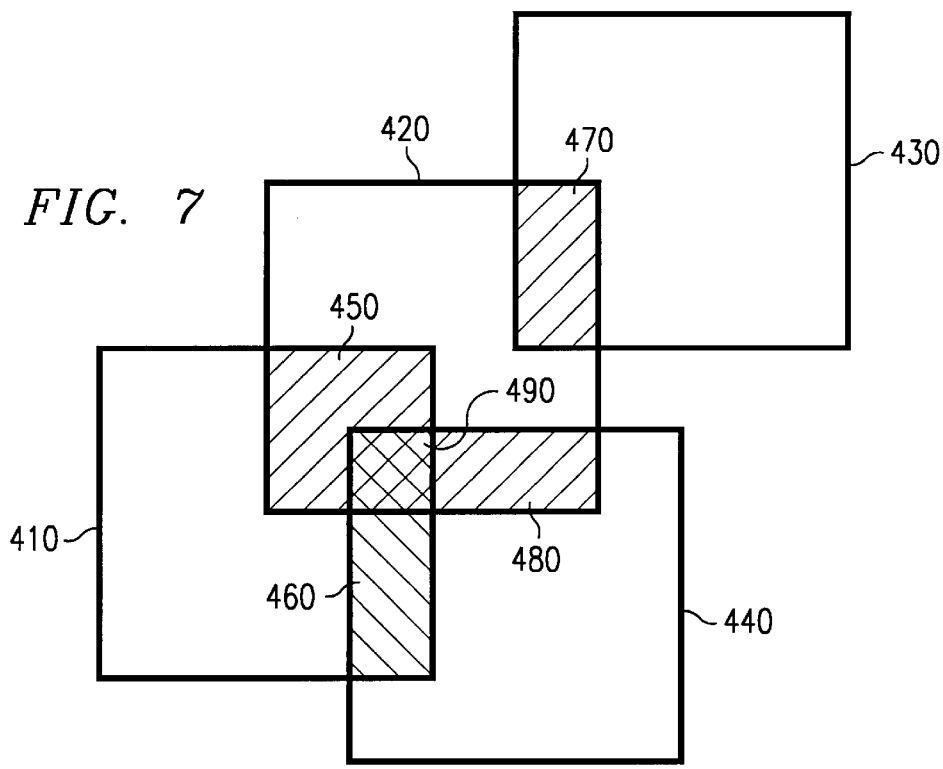
FIG. 7 is a schematic drawing of four data sources illustrating the overlap of the four data sources.

FIG. 7 is a schematic drawing of four data source sets illustrating overlap of the four data source sets. As illustrated in FIG. 7, data source sets 410, 420, 430 and 440 contain depth measurements partially overlapping with each other. Data source sets 410, 420, 430, and 440 are analogous to data source sets 18, 20, and 22 illustrated in FIG. 1; however, four data source sets are illustrated to facilitate description of step 130 of performing a vector shift for the data source sets. In this example, each data source set consists of one corresponding data set. As shown, data source set 410 overlaps with data source set 420, creating an overlap region 450. Data source set 420 overlaps with data source 430, creating an overlap region 470. Data source set 410 also overlaps with data source set 440, creating an overlap region 460. Data source set 420 overlaps with data source set 440, creating an overlap region 480. In addition, an overlap region 490 exists where data source sets 410, 420, and 440 all overlap. Overlap regions 450, 460, 470, 480, and 490 include measurements that require shifting to account for biases associated with each source. Such biases may exist in both the measured depths and measured location in each data source set. Therefore, data source sets 410, 420, 430 and 440 are shifted both horizontally and vertically to correct for detectable biases. Horizontal shifting refers to shifting either along a longitude or a latitude or both.

Referring again to FIG. 6, at step 370 a relative horizontal shift for each pair of overlapping data sets is computed. Such relative shifts are referred to as pairwise shifts. Therefore, in the example illustrated in FIG. 7, a relative horizontal shift between data source sets 410 and 420 is calculated; a relative horizontal shift between data source sets 420 and 430 is calculated; a relative horizontal shift between data source sets 410 and 440 is calculated; and a relative horizontal shift between data source sets 420 and 440 is calculated.

Calculation of a relative horizontal shift between any two data source sets is performed as follows. In calculating a relative horizontal shift between a data source set "a" and a data source set "b," a chi-square ($\chi^2$) and a Pierson regression coefficient ($\rho$) is calculated for the filtered data's depths at the original position of both data sets. The $\chi^2$ value and the Pierson regression coefficient are provided as follows:

$$\chi^2 = \frac{1}{N} \sum (D'_{ai} - D'_{bi}) \tag{2}$$

$$\rho = \frac{\sum D'_{ai} D'_{bi} - \frac{1}{N} \sum D'_{ai} \sum D'_{bi}}{\sqrt{\frac{1}{N}(\sum D'^2_{ai} - \sum D'_{ai} SD'_{ai}) \frac{1}{N}(\sum D'^2_{bi} - \sum D'^2_{bi} SD'_{bi})}} \tag{3}$$

where:
$D'_{ai} = (D_{ai} - M_a)/S_a$
$D'_{bi} = (D_{bi} - M_b)/S_b$
$D_{ai}$=depth of data set "a" at the with position of overlap;
$M_a$=Mean of data set "a" in the area of overlap;
$S_a$=Scale factor used to normalize dataset such that all depths in the overlap region lie between ±1; and
N=the number of overlap points in the region of overlap between the two datasets.

As described above, the horizontal position of each data source set also includes measurement error describing the uncertainty of the horizontal position of a data source set. To compute a relative horizontal shift between two data source sets, all possible relative shifts between the two data source sets that are within twice the largest horizontal measurement error of the two data source sets are attempted. In this case "all possible shifts" means all possible discrete shifts where the increment of a discrete shift is the grid cell resolution. For each relative shift, a chi-square value as a statistic of disagreement and the Pierson correlation coefficient are computed as described above at each possible location. The location that produces the minimum chi-square is the most probable relative horizontal position of the two data sets. However, because the above-described process is subject to measurement and numerical errors, such as noise in the input data, inaccurate interpolation in the gridding process, and possible artifacts from filtering, a minimum chi-square is required before a relative shift is determined to be more desirable than no shift. This minimum condition requires that the chi-square of the shifted position be a factor of ten better than the chi-square corresponding to no shift and that the correlation coefficient be greater than the correlation coefficient corresponding to no shift. If these conditions are met, the relative horizontal shift is determined to be positioned at a minimum chi-square. Otherwise, no horizontal shifts are assigned.

After determining the horizontal pairwise shifts at step 370, a system of equations is developed at a step 380 in order to determine an absolute horizontal shift for each data source set. Based on the calculated relative shifts for each data source set, an absolute horizontal shift for each data source set may be determined. The determination of an absolute horizontal shift set is described below with reference to equations 4 through 9.

If the variable "y" is assigned to represent the correctly shifted origin of each data source set, then $$y_i = x_i + a_i, i = 1, N \tag{4}$$

Where:

N=the number of data sets;

$y_i$=the correctly shifted origin of depth in data set i;

$x_i$=the original, unshifted origin of depth in data set i; and $a_i$=the depth shift for data set i.

Although $y_i$ in equation 4 is unknown, the differences between $x_i$ and $x_k$ (i,k<=N) are merely the pairwise shifts calculated in step 370. In the overlap regions, $y_i = y_k$ by definition. Therefore:

$$x_i - x_k = y_i - a_i - y_k + a_k$$

$$x_i - x_k = a_i + a_k \quad (5)$$

For convenience in notation $O_{i,k}$ is defined to indicate whether two data sets overlap.

$O_{i,k}$=1 if data set $i$ overlaps data set $k$;

0 if the data sets do not overlap; and $$0 \text{ if } i=k. \quad (6)$$

An equation for data set i that overlaps $L_i$ other data sets that utilizes the fact that $L_i = \Sigma_k O_{i,k}$ is written as:

$$\Sigma_k [x_i - x_k] * O_{i,k} = \Sigma_k - [a_i - a_k] * O_{i,k} \quad (7)$$

$$\Sigma_k [x_i - x_k] * O_{i,k} = -L_i * a_i + \Sigma_k [a_k] * O_{i,k} \quad (8)$$

$$\Sigma_k [x_k - x_i] * O_{i,k} = L_i * a_i - \Sigma_k [a_k] * O_{i,k} \quad (9)$$

A similar equation can be written for every other data set i, such that i=1,N. Therefore, a system of N equations with N unknowns is provided that allows calculation of absolute depth shifts for any data source set. This set of equations is solved at a step 390 using a singular value decomposition (SVD) algorithm. The result is a set of shifts for each data source set, "a shift vector", that represents the least squares fit to the observed relative shifts.

The construction of a system of equations is further described below utilizing matrix notation. The adjacency matrix associated with such a set of equations, A, is formed from the coefficients of "a" in Equation 9 for all data sets i. Row i of A corresponds to Equation 9 for data set i. Column k of row i of A corresponds to the coefficient for shift $a_k$ in equation i. Thus, $A_{i,k} = O_{i,k}$ if $i$ is not equal to $k$; and $$L_i \text{ if } i=k. \quad (10)$$

The deviation vector b, associated with such a set of equations is the left hand of Equation 9. Each row i of b corresponds to the sum of deviations for data set i. There is only one column.

$$b_i = \Sigma_k [x_k - x_i] * O_{i,k} \quad (11)$$

The solution set vector c, is just the values of the shifts that can be determined. By definition, for data set i:

$$c_i = a_i \quad (12)$$

The set of equations of the type in Equation 9 for all data sets is represented by the matrix multiplication:

$$A * c = b. \quad (13)$$

Thus, according to the above Equations (4) through (13), a system of equations is constructed based on the horizontal pairwise shifts of each data source set and is solved to produce an least squares vector of horizontal shifts for all data source sets.

For example, the resulting set of equations used to calculate absolute shifts for the four example data source sets 410, 420, 430, and 440 is illustrated below in matrix form.

$$\begin{bmatrix} -2 & 1 & 0 & 1 \\ -1 & -1 & 2 & 1 \\ 0 & -1 & 1 & 0 \\ -1 & -1 & 0 & 2 \end{bmatrix} \begin{Bmatrix} a_1 \\ a_2 \\ a_3 \\ a_4 \end{Bmatrix} = \begin{bmatrix} (x_1 - x_2) + (x_1 - x_4) \\ (x_1 - x_2) + (x_2 - x_3) + (x_2 - x_4) \\ (x_2 - x_3) \\ (x_1 - x_4) + (x_2 - x_4) \end{bmatrix} \quad (14)$$

The right-hand side of the above equation contains known quantities represented by the calculated relative horizontal shifts for each pair of data source sets. Therefore, Equation 14 can be solved for a1, a2, a3, and a4, which represent the absolute horizontal shift for each data source set.

When shifted by the amounts provided in the horizontal vector shift, the four data source sets agree well. However, this solution assumes the horizontal measurement errors in the four data source sets are the same. In general, the horizontal measurement errors are not the same, and we have an estimate of the expected horizontal measurement errors for each data source set. If one data source set is more certain, with smaller expected horizontal measurement error, its position should be given more weight and it should be shifted the least. Thus the vector shifts provided by the equations 14 are adjusted by a constant amount so the data source sets still "line up" but the center of alignment is moved toward the more certain data source set. In one embodiment, the adjustment, applied to all data source sets equally, is computed by an error weighted average of the negatives of the computed shifts. The error weight is the reciprocal of the square of the estimated error for each data source set.

After calculation of horizontal shifts for each data source set, global shifts for depth measurements for each data source set are calculated in the same fashion based on relative depth shifts between pairs of data source sets. Calculation of relative depth shifts between data source sets is described in greater detail below. However, before performing a shift for depth measurements, in a step 400 of FIG. 6 the data source sets are scaled. A scale difference between the data source sets would most likely be caused by a mistaken assignment of units. For example, if depths from one data set were measured in fathoms, and depths from the second data set were measured in meters, but both were assigned units in meters, a scale factor of roughly 1.8 would exist between the data source sets. This scale difference is detected by plotting the measured depths from each of a pair of data source sets at the most probable horizontal alignment and computing the slopes of the resulting lines.

A linear correlation coefficient of the data must be greater than 0.9 to perform any scaling. If it is not, the scale is assumed to be 1. The requirement that the linear correlation coefficient be greater than 0.9 is imposed to avoid introducing a large error in a computed slope if the data are not well correlated. In addition, noise present in the data tends to contribute to errors in the slope of the data, which obscures small scale differences. Therefore, the relative slopes between the pair of data sets must be greater than 1.1 or less than 0.9 before any scaling is performed. A relative scaling is performed with respect to each pair of overlapping data source sets and a system of equations is built at a step 410 and solved at a step 420 in the same manner as steps 380 and 390, described above.

Once all data source sets have been shifted horizontally and scaled, the data are ready for depth shifts. At a step 430 a relative depth shift is determined for each pair of overlapping data source sets. A relative vertical shift is determined after horizontal shifting by computing the mean depth of each data source set in the region of overlap, for example, overlap regions 450, 460, 470, and 480, which might be somewhat changed by the horizontal shifts. The difference in mean depth between two data source sets is the relative vertical shift between these data source sets. Once the relative vertical shifts between each data source set is determined, a system of equations is generated at a step 440. At a step 455, the system of equations is solved. Then the solution is adjusted by adding a constant depth that is on error weighted average, similar to the adjustment made to the horizontal shifts. Thus, step 130 of performing a vector shift results in a plurality of data source sets that are shifted with respect to each other to provide more consistent data than the data source sets before shifting. The shifted data source sets are utilized in step 140 to produce a gridded bottom model, as described below in conjunction with FIG. 8.

Figure 8:
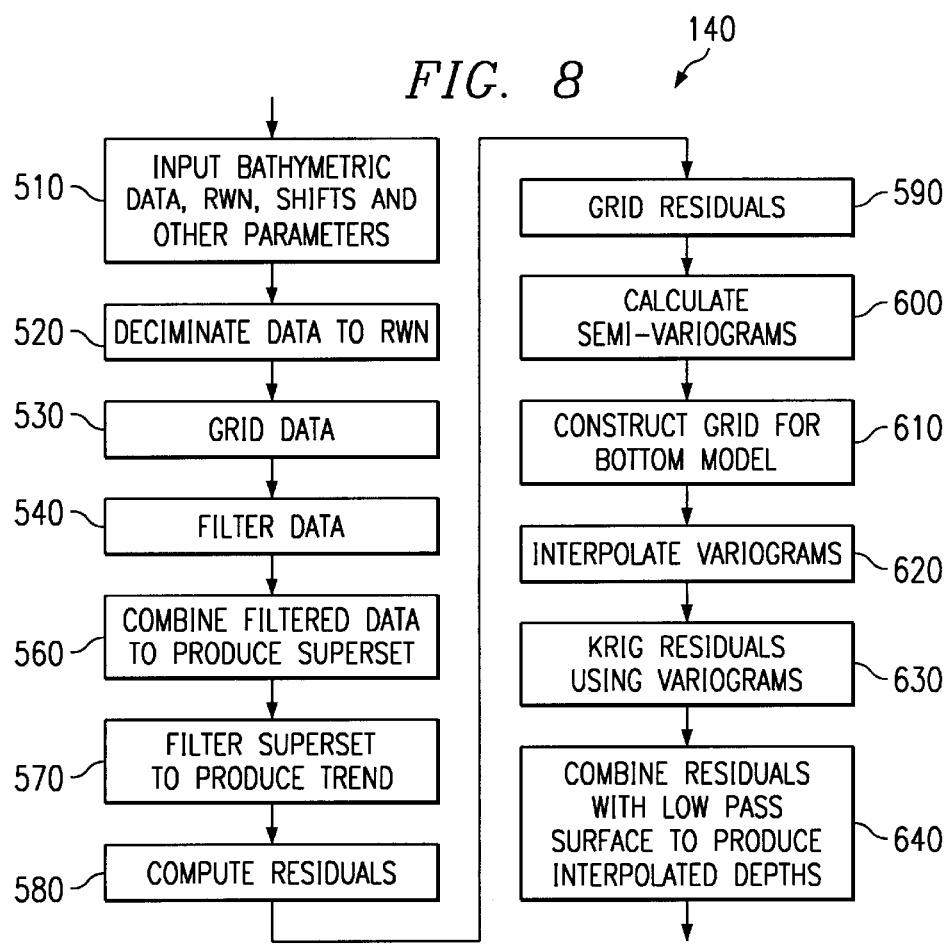
FIG. 8 is a flow chart illustrating steps associated with the step of performing a gridded interpolation, as illustrated in FIG. 3.
Figure 9A:
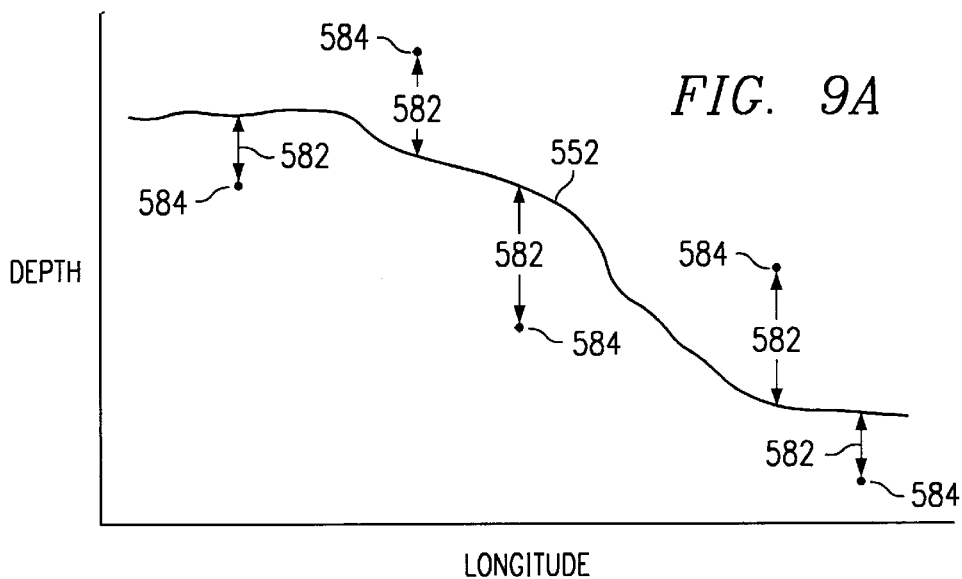
FIG. 9A is a graph illustrating the calculation of residuals from a trend of data according to a portion of the method illustrated in FIG. 8.
Figure 9B:
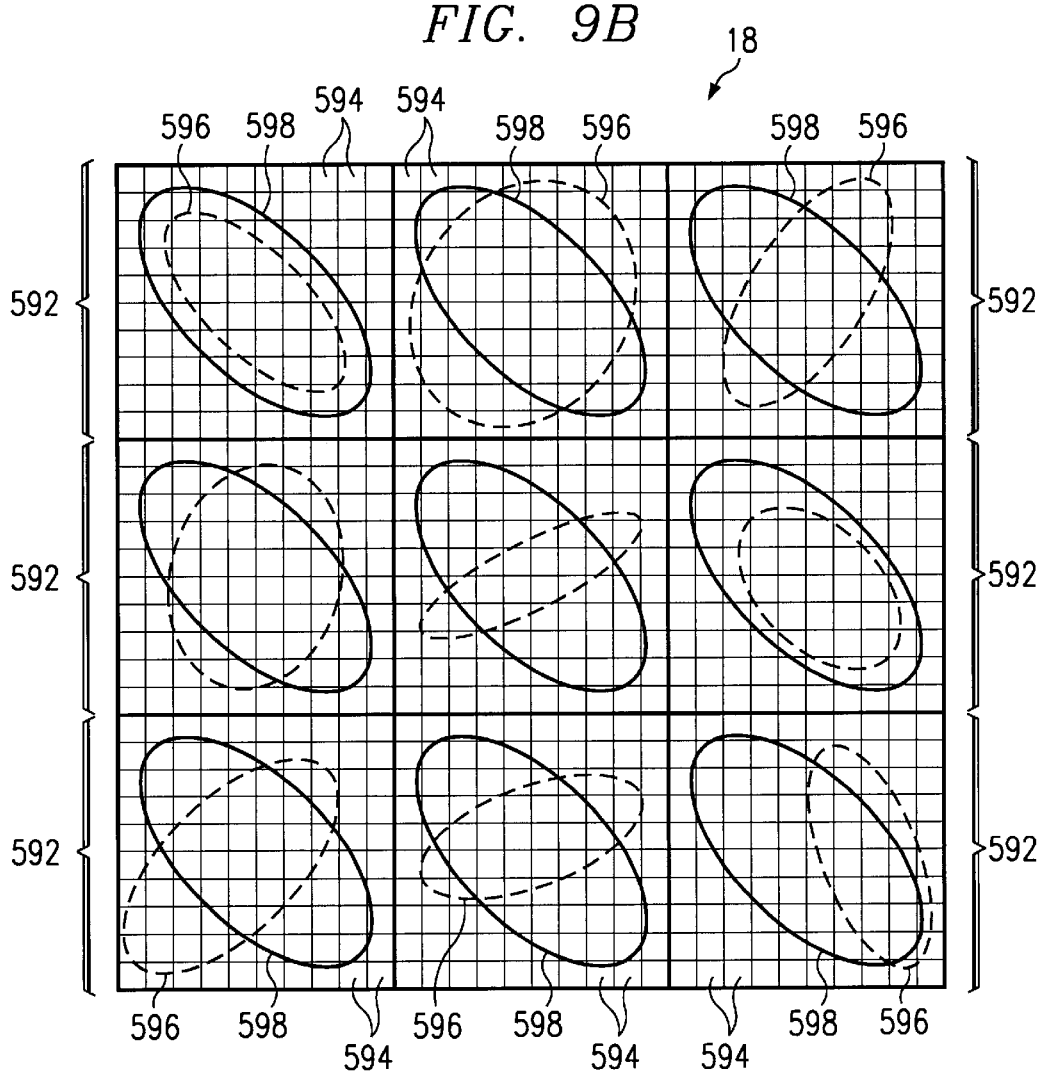
FIG. 9B illustrates the production of a plurality of semi-variograms according to a portion of the method illustrated in FIG. 8.

FIG. 8 is a flow chart illustrating steps associated with step 140 of performing a gridded interpolation, and FIGS. 9A and 9B each illustrate a portion of a step illustrated in FIG. 8. Step 140 of performing a gridded interpolation is initiated with a step 510 of receiving bathymetric data, Real World Nyquist frequencies for each data set, shifted data sets, and additional parameters. At a step 520, the shifted data sets are decimated to the computed Real World Nyquist wavelengths of each data set within the data source sets. The resulting data are gridded, for example, by the Triangular Irregular Network algorithm described above. This gridding step is performed at a step 530. At a step 540 the gridded data are filtered to produce a low pass component. After filtering at step 540, an additional gridding step (not explicitly shown) may be performed to grid the filtered data to the finest resolution of all contributing data sets. At a step 560 all gridded, filtered data sets are combined into a single superset of data using grid cell averaging and filtered at a step 560 to produce a low pass component of the superset. This low pass component is illustrated as an end line 552 in FIG. 9A. The filtering is performed, for example, by using a standard Gaussian filter having a half width equal to ten times the highest resolution of all contributing data sets. This filtering process smooths the effects of the combination process and removes most remaining white noise from the data. The filtering of the combined data occurs at a step 570.

At a step 580, the differences between each data point 584 (see FIG. 9A) in all data sets and the combined filtered superset of data is determined to produce a plurality of residuals 582, also illustrated in FIG. 9A. Residuals are computed by subtracting the decimated data from the combined low pass superset. These residuals are gridded at step 590 and semi-variograms are computed automatically at step 600 for a group of cells, or a grid unit 592 (see FIG. 9B), formed by the bottom model grid for use in an interpolation step. Example grid units 592 are illustrated in FIG. 9B for data source set 18. As illustrated, each grid unit 592 comprises one hundred cells 594. [A semi-variogram is a directional measure of the variance of the residuals.]

In one embodiment, a semi-variogram 596 is calculated for each 20×20 group of cells based on the depth values in that group of cells. Calculating a semi-variogram for each group of cells based on the residual depth values in the group of cells leads to more accurate interpolated depth values than techniques that utilize a single semi-variogram that is calculated based on all available data in the data source set. Semi-variograms 598 illustrate an example based on all data within a data source set. Such semi-variograms all have the same size, shape, and orientation and do not account for varying levels of correlation of data within a data source set. The more accurate interpolated depth values are attributed to utilizing semi-variograms that are based on nearby data rather than all data because generating a variogram based on all available data assumes a constant level of correlation between the data and does not allow for utilizing more data points for interpolation where data are better correlated and less data points for interpolation where data are not as well correlated.

At a step 610 a grid is constructed for the resulting bottom model. The bottom model grid is latitude and longitude based or alternatively is an equidistant or other suitable grid. At a step 620, semi-variograms are computed for each output grid node using a bi-linear interpolation of the variograms calculated at step 600 from each contributing data set. Thus in overlap regions such as overlap regions 24 and 26, semi-variograms from each contributing data set are interpolated to produce one variogram for each grid point. At a step 630, the residual depths are then interpolated at each output grid node. Uncertainties in the interpolated residual depths are also calculated. The interpolation of the depths is performed, according to the present embodiment, according to multi-variant Kriging. Multi-variant Kriging is described in *Introduction to Disjunctive Kriging and Nonlinear Geostatistics*, by J. Rivoirand, 1994, Clarendon Press, Oxford University Press, which is incorporated herein by reference. At a step 640, the interpolated residuals are combined with the low pass surface to produce model depth values at each grid point, resulting in calculated depth values 14 at locations 12 in bottom model 10. Furthermore, according to the invention, depths are calculated at selected grid nodes based on variograms based on only surrounding data points rather than all data points. Such calculation produces more accurate depth calculations than those produced based upon variograms generated based on all data points. The increased accuracy is attributed to the use of only highly correlated data in interpreting a depth value at a given grid point. The invention therefore provides a bottom model that is more accurate than existing techniques.

Figure 10:
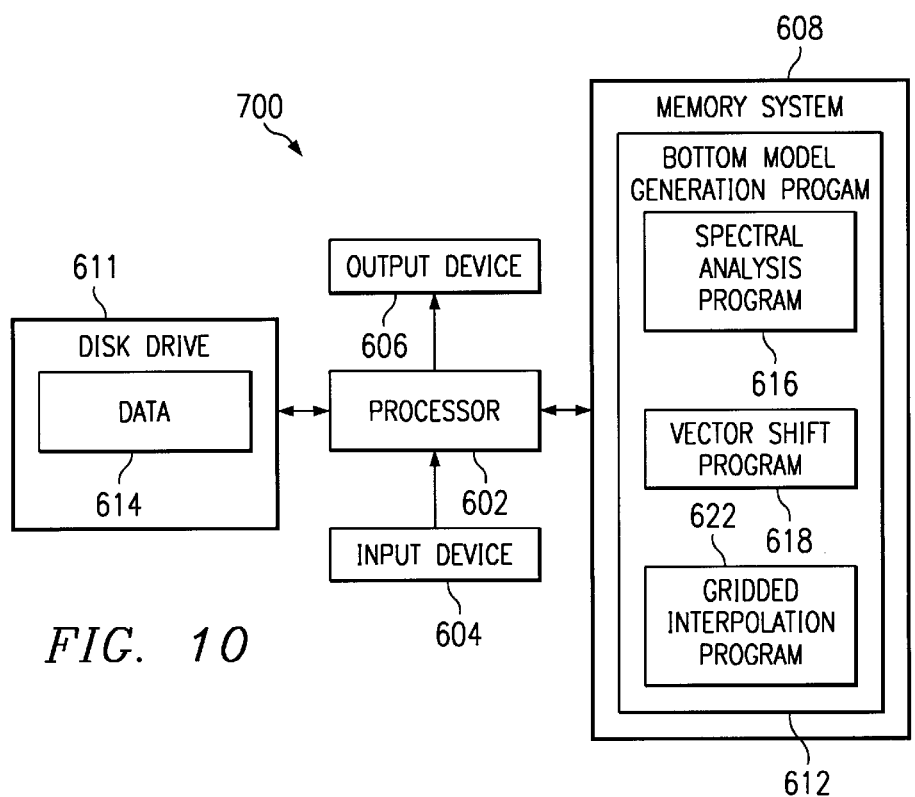
FIG. 10 is a block diagram of a bottom model generation system for generating a representation of a floor of an ocean according to the teachings of the present invention.

Referring to FIG. 10, there is shown a block diagram of a bottom model generation system 700 for generating a representation, or bottom model 10, of a floor of an ocean or other body of water. Bottom model generation system 700 includes a processor 602, an input device 604, an output device 606, a memory system 608, and a disk drive 611. The present embodiment includes computer software stored in memory system 608 or on disk drive 611 and is executed by processor 602. Disk drive 611 includes a variety of types of storage media such as, for example, floppy disk, hard disk, CD ROM disk, or magnetic tape. Data is received from a user of bottom model generation system 700 using a keyboard or other type of input device 604. Data is provided to a user of bottom model generation system 700 through output device 606, which may include a display, printer, or any other suitable type of output device.

Bottom model generation system 700 includes a bottom model program 612. In FIG. 10, bottom model program 612 is illustrated as stored in memory system 608 and will be executed by processor 602. Bottom model generation is alternatively stored on disk drive 611. Processor 602 when executing bottom model program 612 receives measured data and generates a bottom model according to the method described in conjunction with FIGS. 3 through 8. Bottom model program 612 includes a spectral analysis program 616, a vector shift program 618, and a gridded interpolation program 622. Spectral analysis program 616 performs a spectral analysis according to step 120 described in conjunction with FIGS. 4 and 5. Vector shift program 618 performs a vector shift according to step 130 described in conjunction with FIGS. 6 and 7. Gridded interpolation program performs a gridded interpolation according to step 140.

Although the invention and its advantages have been described in detail for example embodiments, it should be understood that various changes, substitutions, and alterations can be made therein without departing from the spirit and scope of the invention as defined by the appended claims and their equivalents.

What is claimed is:

1. A method for generating a model of a portion of a floor of a body of water from a plurality of depth measurements at a plurality of locations from a plurality of depth measurement sources, the method comprising the steps of:

deriving a wavelength spectrum from the plurality of depth measurements from each source of the plurality of depth measurement sources;

fitting each wavelength spectrum to a third order polynomial to produce a fitted wavelength spectrum for each source of the plurality of depth measurement sources;

determining a real world Nyquist wavelength for each source of the plurality of sources based on the fitted wavelength spectrum for each source of the plurality of depth measurement sources;

determining a model grid with variable model grid spacing based on the real world Nyquist wavelengths for the plurality of depth measurement sources; and determining depths for the model grid based on the plurality of depth measurements from the plurality of depth measurement sources.

2. The method of claim 1, said step of determining depths for the model grid further comprising decimating the plurality of depth measurements from each source based on the real world Nyquist wavelength for each source.

3. The method of claim 1, said step of determining the real world Nyquist wavelength for each source further comprising:

determining a first inflection point for the fitted wavelength spectrum; and determining the real world Nyquist wavelength for the source based on the first inflection point.

4. The method of claim 3, said step of determining the real world Nyquist wavelength for the source based on the first inflection point further comprising determining the closest wavelength longer than a wavelength of the first inflection point, where the wavelength spectrum at the closest wavelength has an amplitude greater than a threshold amount above a minimum amplitude of the wavelength spectrum.

5. A method for generating a model of a portion of a floor of a body of water from a plurality of depth measurements at a plurality of locations from a plurality of depth measurement sources, the method comprising the steps of:

h. determining a real world Nyquist wavelength associated with each source of the plurality of depth measurement sources;

i. determining a uniform horizontal grid with a grid spacing based on a minimum real world Nyquist wavelength among a plurality of real world Nyquist wavelengths associated with a plurality of overlapping depth measurement sources of the plurality of depth measurement sources;

j. interpolating the plurality of depth measurements for each source of the plurality of overlapping depth measurement sources to the uniform horizontal grid;

a. determining an overlap region between two sources of the plurality of overlapping depth measurement sources;

b. determining a first measure of difference between depths of the two sources in the overlapping region using the depth values interpolated to the uniform horizontal grid;

c. determining a pairwise shift between the two sources that produces a second measure of difference between depths of the two sources using the depth values interpolated to the uniform horizontal grid, which second measure is substantially less than the first measure;

d. determining an error in the direction of shift associated with each source;

e. determining an absolute shift associated with each source based on the pairwise shift and the error associated with each source;

f. generating a plurality of shifted depth measurements from the plurality of depth measurement sources based on the absolute shift associated with each source; and g. determining depths for the model based on the plurality of shifted depth measurements from the plurality of depth measurement sources.

6. The method of claim 5, said step of determining the pairwise shift further comprises:

generating a set of shifts;

generating a set of measures of differences between the depths of the two sources, wherein each measure in the set of measures is associated with each shift in the set of shifts;

selecting as the pairwise shift a shift of the set of shifts that is associated with the smallest measure of difference among the set of measures of differences; and determining the second measure based on the smallest measure.

7. The method of claim 6, said step of generating the set of shifts further comprising generating the set of shifts to extend up to a distance corresponding to about twice the maximum error in the direction of shift among the plurality of depth measurement sources.

8. The method of claim 7, said step of determining the pairwise shift further comprises:

determining that the pairwise shift is in a horizontal direction;

generating a set of horizontal shifts that are integral multiples of the grid spacing;

generating a set of measures of differences between the depths of the two sources, wherein each measure in the set of measures is associated with each shift in the set of horizontal shifts;

selecting as the pairwise shift a shift of the set of shifts that is associated with the smallest measure of difference among the set of measures of differences; and determining the second measure based on the smallest measure.

9. The method of claim 5, wherein:

the first measure and the second measure include a chi-square statistic of the differences between depths of the two sources; and said step of determining the pairwise shift further comprises determining whether the chi-square statistic of the second measure is not less than one tenth of the chi square value statistic of the first measure, and if it is determined that the chi-square statistic of the second measure is not less than one tenth of the chi square value statistic of the first measure, then setting the pairwise shift to zero.

10. The method of claim 5, said step of determining the pairwise shift further comprising:

determining a first correlation between depths of the two sources in the overlapping region;

determining a second correlation between depths of the two sources in an overlapping region after shifting by the pairwise shift between the two sources;

determining whether the second correlation is substantially greater than the first correlation, and if it is determined that the first correlation is not substantially greater than the second correlation, then setting the pairwise shift to zero.

11. The method of claim 5, wherein steps c, d and e are performed for a two-dimensional horizontal shift; and the method further comprises repeating steps c, d and e for a vertical shift before performing steps f and g.

12. The method of claim 11, further comprising determining a substantial depth scale difference in an overlap region after shifting the sources based on the absolute horizontal shift and before repeating steps c, d and e for determining the absolute vertical shift.

13. A method for generating a model of a portion of a floor of a body of water from a plurality of depth measurements at a plurality of locations from a plurality of depth measurement sources, the method comprising the steps of:

determining a real world Nyquist wavelength associated with each source of the plurality of depth measurement sources;

determining a uniform grid with grid spacing based on a minimum real world Nyquist wavelength among a plurality of real world Nyquist wavelengths associated with the plurality of depth measurement sources;

interpolating the plurality of depth measurements for each source of the plurality of depth measurement sources to generate interpolated depths on the uniform grid for each source;

filtering out wavelengths less than about ten times the minimum real world Nyquist wavelength from a combination of the interpolated depths on the uniform grid from all sources to generate a low pass surface on the uniform grid;

determining residual depths on the uniform grid by differencing the interpolated depths on the uniform grid for each source;

determining a plurality of semi-variograms for each source of the plurality of depth measurement sources based on the residuals from each source;

determining a model grid with variable model grid spacing based on the real world Nyquist wavelengths for the plurality of depth measurement sources; and determining depths for the model grid based on the residuals and the plurality of semi-variograms for each source.

14. The method of claim 13, said step of determining the plurality of semi-variograms for each source further comprising determining a first semi-variogram for a first source based on the residuals of the first source at a first set of contiguous grid positions on the uniform grid.

15. The method of claim 14, said step of determining the plurality of semi-variograms for each source further comprising determining a different, second semi-variogram based on the residuals at a different, second set of contiguous grid positions on the uniform grid.

16. The method of claim 15, wherein the number of grid positions in the first set and the number of grid positions in the second set are based on the number of grid positions that fit in an area that is proportional to an integral multiple of the grid spacing.

17. The method of claim 16, wherein the integral multiple is between about ten and about thirty.

18. The method of claim 15, wherein the first set is offset from the second set by about ten times the grid spacing.

19. The method of claim 14, said step of determining depths for the model grid based on the residuals and the plurality of semi-variograms for each source further comprising using the first variogram to generate a model depth value at a particular model grid position if the first set of contiguous grid positions on the uniform grid is within a threshold distance of the particular model grid position.

* * * * *

UNITED STATES PATENT AND TRADEMARK OFFICE
CERTIFICATE OF CORRECTION

PATENT NO. : 6,721,694 B1
DATED : April 13, 2004
INVENTOR(S) : Mark A. Lambrecht et al.

It is certified that error appears in the above-identified patent and that said Letters Patent is hereby corrected as shown below:

Title page,
Item [56], References Cited, OTHER PUBLICATIONS,
"Penny Dunn" reference, "Fusion for a Model Seafloor Depths," should be
-- Fusion for a Model of Seafloor Depths," --.
"Remote Sensing for Marine and Costal Environments," reference, "Marine and Costal Environments," should be -- Marine and Coastal Environments, --; and "199.7" should be -- 1997 --.
"I-I Lin and W.G. Rees," reference, "Apatial Texture" should be -- Spatial Texture --; and "Sheeet" should be -- Sheet --.
"A. T. C. Chang," reference, quotation marks should be around the title, namely "Decorrelation Distance of Snow in the Colorado River Basin".

Column 8,
Line 23, "at the with position" should be -- at the width position --.

Column 9,
Line 29, equation 9, "$\sum_k [x_k - x_i] * O_{i,k} = L_i * a_i - \sum_k [a_k] * O_{i,k}$" should be -- $\sum_k [x_k - x_i] * O_{i,k} = L_i * a_i - \sum_k [a_k] * O_{i,k}$ --

Signed and Sealed this

Eighth Day of February, 2005

JON W. DUDAS
*Director of the United States Patent and Trademark Office*